United States Patent [19]

Boet

[11] Patent Number: 4,987,970

[45] Date of Patent: Jan. 29, 1991

[54] DEVICE FOR COLLECTING THE EXHAUST GAS JET OF AN AIRCRAFT REACTOR AND A TESTING INSTALLATION FOR AIRCRAFT REACTORS

[75] Inventor: Jean-Paul Boet, Villeneuve d'Asco, France

[73] Assignee: Societe Anonyme dite: S. A. Andre Boet, Villeneuve d'Asco, France

[21] Appl. No.: 283,919

[22] Filed: Dec. 13, 1988

[30] Foreign Application Priority Data

Jun. 17, 1988 [FR] France .................. 88 08164

[51] Int. Cl.⁵ .................................................. B64E 1/26
[52] U.S. Cl. .................................... 181/217; 181/218; 181/220; 181/221
[58] Field of Search ............... 181/203, 217, 218, 220, 181/221

[56] References Cited

U.S. PATENT DOCUMENTS

| | | | |
|---|---|---|---|
| 3,011,584 | 12/1961 | Lemmerman et al. | 181/221 X |
| 3,120,877 | 2/1964 | Morris et al. | 181/217 |
| 3,185,252 | 5/1965 | Lemmerman | 181/217 |
| 3,289,943 | 12/1966 | Thomas et al. | 239/127.1 |
| 3,378,204 | 4/1968 | Chase et al. | 239/127.3 |
| 3,715,009 | 2/1973 | Smith et al. | 181/218 |
| 4,168,763 | 9/1979 | White et al. | 181/218 |

FOREIGN PATENT DOCUMENTS 1187245 11/1957 France .
1376571 7/1963 France .

Primary Examiner—B. R. Fuller
Attorney, Agent, or Firm—Fisher, Christen & Sabol

[57] ABSTRACT

The invention provides a device for collecting the exhaust gas jet of an aircraft reactor with orientable propulsion nozzle or with a gas jet orientable with respect to the longitudinal axis of said reactor, during ground testing of the latter, as well as a testing installation for aircraft reactors equipped with said device. The device comprises an external cylindrical jacket bell-mouthed at its end intended to be situated opposite the tested reactor and a cylindrical internal jacket, concentric to said external jacket and intended for straightening out the exhaust gas jet when this latter or the propulsion nozzle of the tested reactor has a slant with respect to the axis of said reactor.

15 Claims, 4 Drawing Sheets

DEVICE FOR COLLECTING THE EXHAUST GAS JET OF AN AIRCRAFT REACTOR AND A TESTING INSTALLATION FOR AIRCRAFT REACTORS

BACKGROUND OF THE INVENTION

The present invention relates to a device for collecting the exhaust gas jet of an aircraft reactor with orientable propulsion nozzle or with a gas jet orientable with respect to the longitudinal axis of said reactor, during ground testing of the latter, as well as an aircraft reactor testing installation equipped with said device.

Such installations generally comprise a silencer generally in the form of an elongate cylindrical body disposed behind the reactor which is to be tested on the ground, which silencer collects the exhaust gases of the reactor, allows them to be cooled and discharges them to the atmosphere after attenuation of the exhaust noise. The known silencer of this type is quite appropriate for conventional reactors which eject the exhaust gases along the longitudinal axis of the reactor.

However, a new generation of reactors is being developed at the present time by constructors, namely reactors with a propulsion nozzle orientable with respect to the longitudinal axis thereof. When the gas jet from the reactor or when the propulsion nozzle of the reactor being tested has a certain slant with respect to said longitudinal axis (called "vector" operation), the end portion of the silencer the nearest to the reactor is exposed, at least the portion thereof which is struck by the exhaust gas jet, to very high temperatures of about 2000° C., which most conventional metals and metal alloys cannot withstand.

SUMMARY OF THE INVENTION

The object of the present invention is to solve this problem and relates to a device for collecting and straightening out the exhaust gas jet of an aircraft reactor with orientable propulsion nozzle before it reaches the silencer properly speaking.

For this, the device for collecting the exhaust gas jet of an aircraft reactor with orientable propulsion nozzle or with a gas jet orientable with respect to the longitudinal axis of said reactor, during ground testing thereof, is remarkable, in accordance with the invention in that it comprises an external jacket of a general cylindrical shape, having a bell-mouth in the vicinity of its end intended to be situated opposite the tested reactor, and an internal jacket of general cylindrical shape, concentric with said external jacket and intended to straighten out the exhaust gas jet when the latter or the propulsion nozzle of the tested reactor has a certain slant with respect to the longitudinal axis of said reactor.

Thus, when the exhaust gas jet from the reactor reaches the silencer properly speaking, disposed downstream of said device with respect to the flow direction of said jet, the latter is again at least substantially parallel to the longitudinal axis of the silencer and there is no risk of it striking the walls thereof.

Advantageously, at least some portions of said internal jacket are adapted so as to allow a cooling fluid to flow therein, such cooling avoids the use of special refractory materials, such as ceramic, which are heavy, fragile and expensive.

In particular, said internal jacket may comprise at least a first coil, for the flow of said cooling fluid, extending generally along the generatrices of the cylinder formed by said internal jacket.

Furthermore, in the vicinity of its downstream end with respect to the flow direction of the exhaust gas jet, said internal jacket may comprise at least a second coil forming turns about the longitudinal axis of said internal jacket.

Advantageously, the downstream end portion of the internal jacket is narrowed, which participates in straightening the exhaust gas jet.

According to another characteristic of the invention, said first coil is split up into a plurality of independent longitudinal sections. Thus, it is possible to take into account the fact that the hot exhaust gases at a given moment of testing of the reactor, only strike a particular angular sector of the internal jacket.

Preferably, said independent longitudinal sections are fed from a common cooling fluid source.

Means may further be provided for regulating the fluid flow in each of said sections.

According to yet another characteristic of the invention, the bell-mouth end portion of said external jacket is adapted for allowing a cooling fluid to flow therein. That is particularly advantageous when the tested reactor operates with thrust reversal.

Furthermore, said external and internal jackets may be made from metal, particularly from steel, and the cooling fluid may be water.

The present invention also relates to a ground testing installation for aircraft reactors, comprising a silencer with a general cylindrical elongate body, intended to be disposed behind the tested reactor, which is remarkable in that, between the reactor and the silencer, a device such as defined above is provided.

In said installation, in particular, the silencer may be mobile with respect to said device.

In the case where, at its upstream end with respect to the flow direction of the exhaust gas jet of the reactor, the silencer has an air suction chimney, it is advantageous, in service, for the downstream portion of said device to be disposed under said chimney.

BRIEF DESCRIPTION OF THE DRAWINGS

The figures of the accompanying drawings will better show how the invention may be put into practice. In these figures, identical references designate similar elements.

DESCRIPTION OF THE PREFERRED EMBODIMENTS

Figure 1:
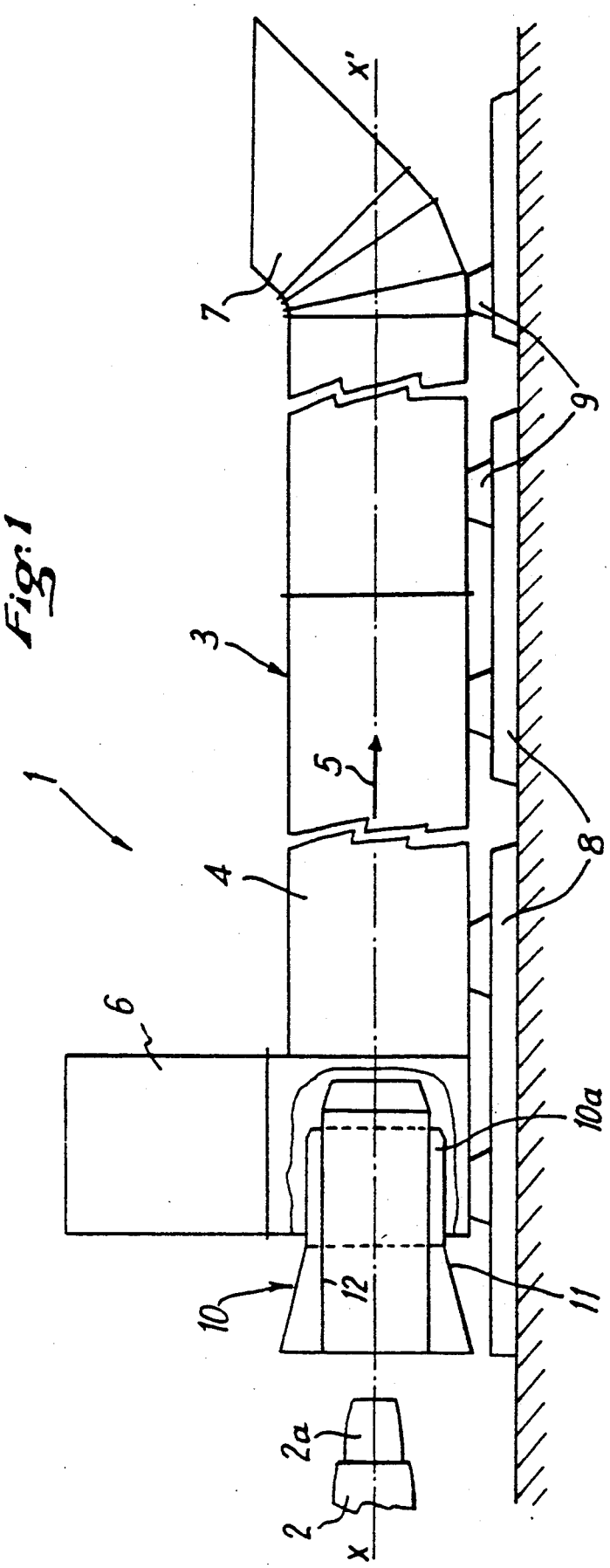
FIG. 1 is a schematic view with parts cut away of a ground testing installation for aircraft reactors.

Referring to FIG. 1, the ground testing installation 1 for aircraft reactors 2 comprises a silencer 3 with an elongate tubular body 4 of a general cylindrical shape, disposed behind the tested reactor 2. At its upstream end, with respect to the flow direction (arrow 5) of the exhaust gas jet of the reactor 2, the silencer 3 has, in this embodiment, an air suction chimney 6. At its downstream end, the silencer 3 ends in an upwardly bent portion 7, through which the cooled exhaust gases are discharged to the atmosphere. Moreover, silencer 3 is in this case mounted movable on rails 8 by means of carriages 9.

In addition, between reactor 2 and silencer 3, a device 10 is provided for collecting the exhaust gas jet of the reactor 2, whose propulsion nozzle 2a is orientable with respect to the longitudinal axis X,X' of said reactor. In service, the downstream portion 10a of device 10 is disposed, as can be seen in FIG. 1, under chimney 6.

Figure 2:
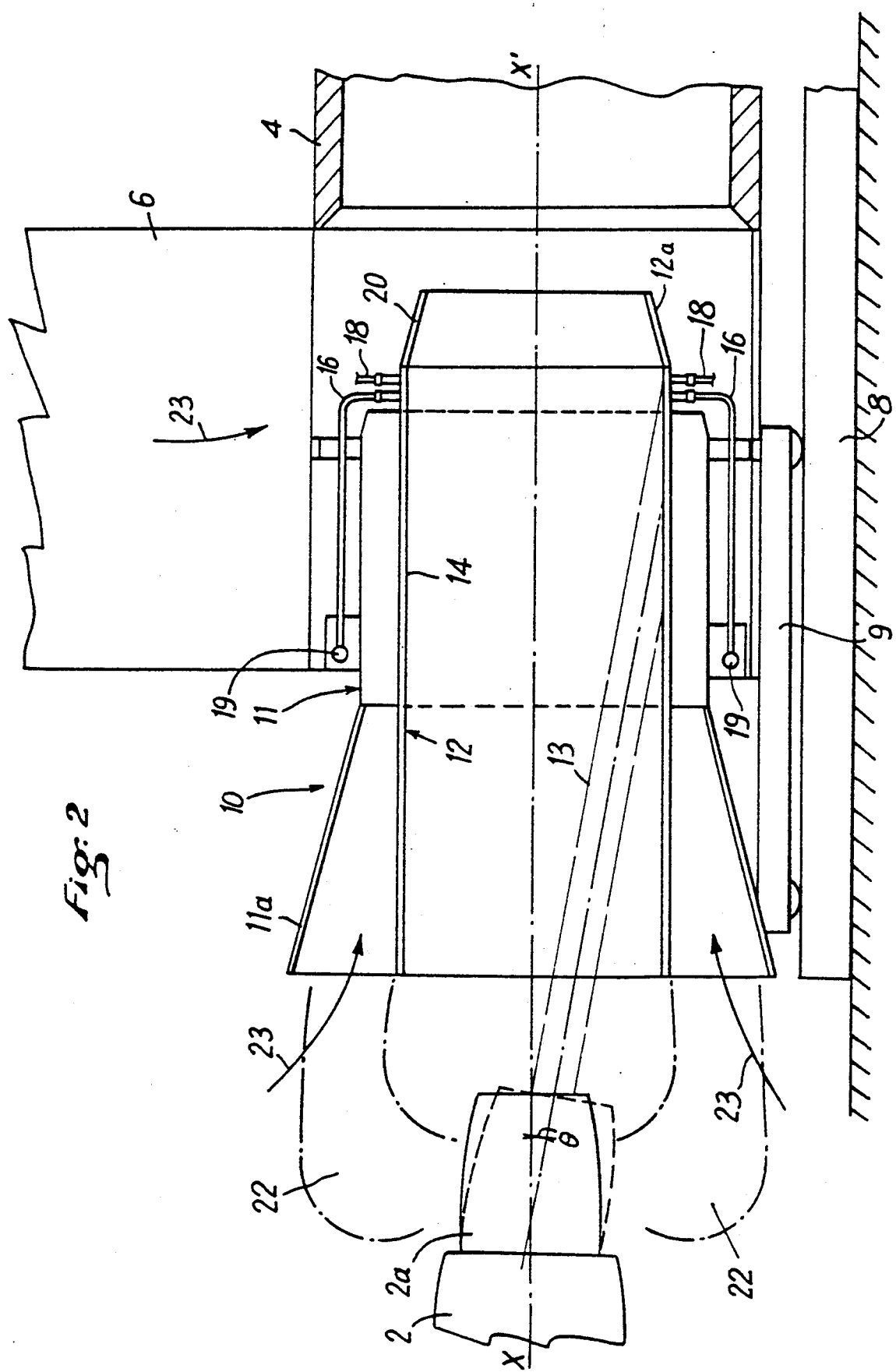
FIG. 2 is a schematic longitudinal sectional view of the jet collecting device of the invention.

Referring now more particularly to FIG. 2, the device 10 comprises an external portion 11 of general cylindrical shape, bell-mouthed in the vicinity of its end 11a situated opposite the tested reactor 2 and an internal jacket 12 of general cylindrical shape concentric with the external jacket 11 (in service, the longitudinal axis of the external 11 and internal 12 jackets merges advantageously with the longitudinal axis X,X' of reactor 2) and intended to straighten out the exhaust gas jet 13 when this latter or the propulsion nozzle 2a of the tested reactor 2 has a certain slant with respect to the longitudinal axis X,X' of reactor 2.

More particularly, the internal jacket 12 is adapted for allowing a cooling fluid such as water to flow therein. Such an internal jacket could, for example, be in the form of a double casing. However, it is advantageous, as shown in FIGS. 3 and 4, for the internal jacket 12 to be formed of coils, in which the cooling water may flow.

Figure 3:
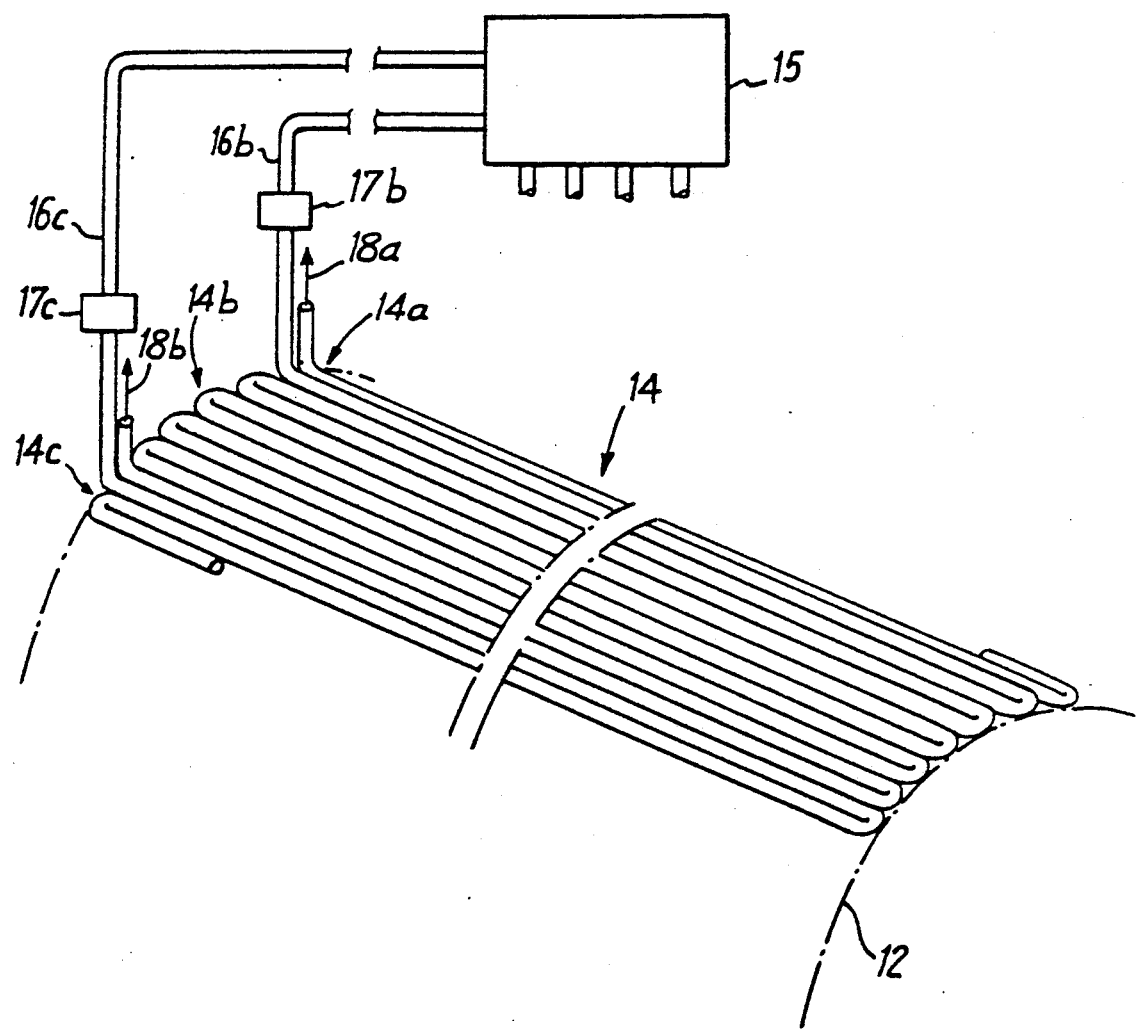
FIG. 3 is a partial perspective schematic view of a first coil of the internal jacket of the device of the invention.
Figure 4:
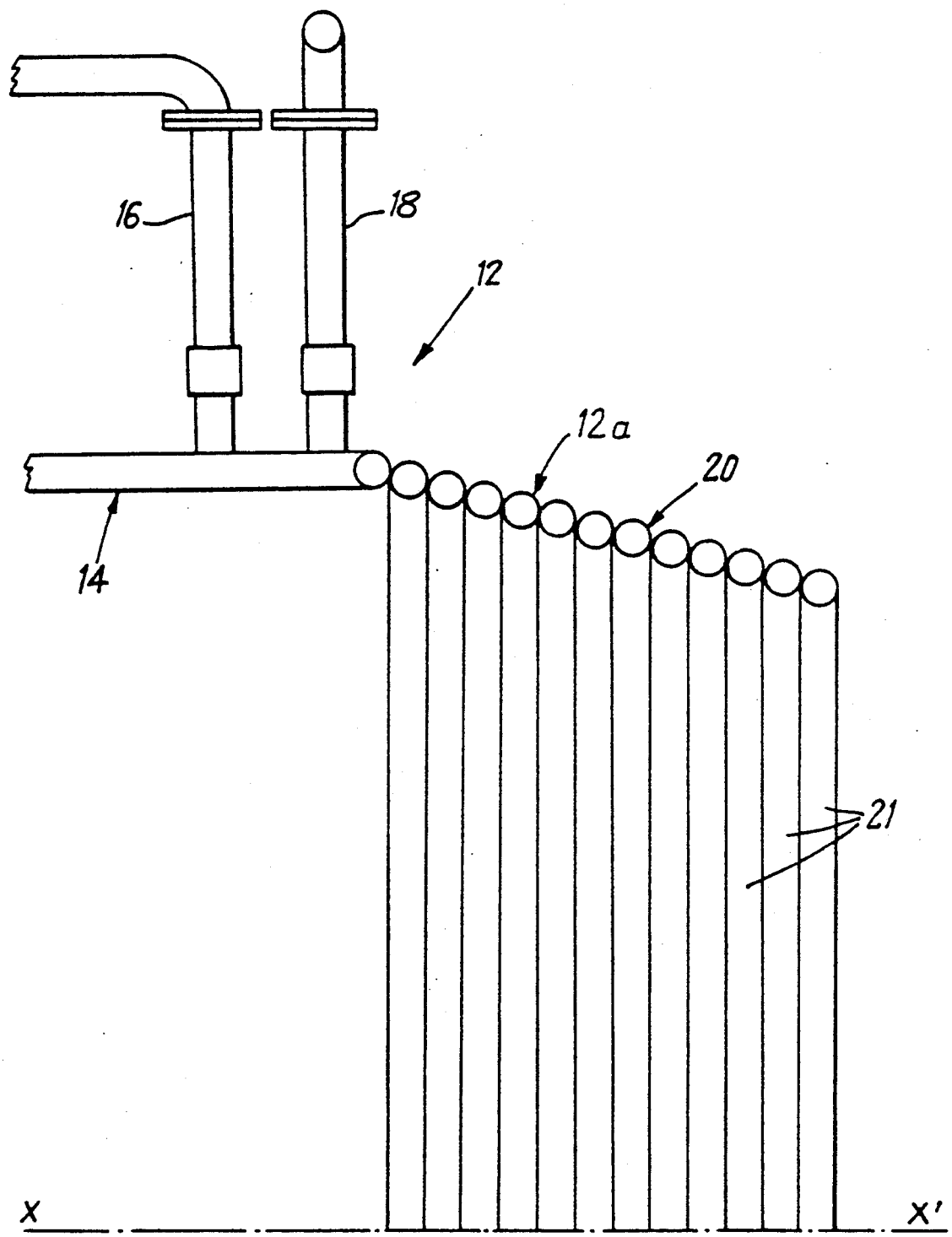
FIG. 4 is an enlarged partial schematic view of the downstream part of the internal jacket.

More particularly, referring to FIG. 3, the internal jacket 12 comprises a first coil 14 extending generally along the generatrices of the cylinder formed by the internal jacket 12. This coil 14 is split up into a plurality of independent longitudinal sections 14a, 14b, 14c, etc. . . , fed from a common cooling water source 15. Furthermore, the water intake pipe 16b, 16c of each section is provided with means 17b, 17c for regulating the water flow through each individual section. As already mentioned, through splitting up the coil 14 into independent longitudinal sections (whose number may go up to fifteen or so) it is possible to take into account the fact that the hot exhaust gases, at a given time during testing of the reactor, only strike a particular angular sector of the internal jacket, by adjusting the water flow regulation means. In practice, the heat which is to be removed "evolves" gradually when passing from the angular sector struck directly by the hot gases to the opposite sector and the water flow rates in each section will be regulated accordingly, e.g. manually before each test. It would also be possible to provide a servo-control of the flowrates as a function of the evolution of the test conditions.

As shown by arrows 18a, 18b, the water, which has passed through the corresponding coil sections, is discharged to the outside, to be possibly recycled.

In addition, as shown in FIG. 2, it may be advantageous to feed the set of water intake pipes 16 from a common pipe 19, peripheral to the external jacket 11, the water being discharged through the corresponding pipes 18.

Furthermore, as shown in FIG. 4, in the vicinity of its downstream end with respect to the flow direction of the exhaust gas jet, the internal jacket 12 comprises a second coil 20 forming turns 21 about the longitudinal axis X,X' of the internal jacket 12. This downstream end portion 12a of the internal jacket 12 is narrowed, which participates in straightening out the exhaust gas jet (it will be noted that, in FIG. 4, the different branches of coil 14 have not been shown for the sake of clarity of the drawing).

In addition, the bell-mouth portion 11a of the internal jacket 11 may be adapted for allowing a cooling fluid such as water to flow therein. As already mentioned, that is particularly advantageous when, during testing, the reactor 2 operates with thrust reversal, delivering the hot exhaust gas jets 22. As for the internal jacket 12, the external jacket 11 may then have a double skin, or one or more coils for the flow of the cooling fluid, which is shown symbolically in FIG. 2 by a double line for the bell-mouth portion 11a of the collecting jacket 11.

It will also be noted that, because of their cooling, the external 11 and internal 12 jackets may be made from a conventional metal such as steel.

During testing, when the propulsion nozzle 2a of reactor 2 is slanted through a certain angle with respect to the longitudinal axis X,X', the internal jacket 12 makes it possible to straighten out and cool the exhaust gas jet 13, before it enters the body 4 of the silencer properly speaking 3. Such cooling is assisted by the suction of fresh air through chimney 6 and by the trumpet effect between the bell-mouth portion 11a of the external jacket 11 and the internal jacket 12 (arrows 23). The straightened and cooled exhaust gas jet 13 then passes through the body 4 of silencer 3 and is discharged to the atmosphere, after attenuation of the exhaust noise, through the bent portion 7 of the silencer 3. The mobility of silencer 3 further makes it possible to adapt the testing installation 1 to a particular type of reactor (configuration, power etc. . .).

What is claimed is:

1. A ground testing installation for an aircraft reactor having a longitudinal axis and a propulsion nozzle orientable with respect to the longitudinal axis of said reactor, the installation comprising:
    a silencer, having a body of a generally cylindrical elongate shape, for positioning behind a propulsion nozzle of said reactor, and
    a device for collecting an exhaust gas jet of the reactor, disposed between the reactor and the silencer, said device having an external jacket with a generally cylindrical shape and a bell-mouthed intake end adapted to be situated opposite the propulsion nozzle, and an internal jacket of a generally cylindrical shape having an interior volume and concentric to said external jacket to straighten out the exhaust gas jet when the propulsion nozzle of the reactor has a slant with respect to the longitudinal axis of said reactor, said internal jacket comprising coils that define a hollow volume for receiving cooling fluid for cooling exhaust gas passing through said interior volume.

2. The installation as claimed in claim 1, wherein at least one of said coils forms turns about the longitudinal axis of said internal jacket at a downstream end of said internal jacket.

3. The installation as claimed in claim 2, wherein the downstream end of the internal jacket is narrowed.

4. The installation as claimed in claim 1, wherein said coils are split up into a plurality of independent longitudinal sections.

5. The installation as claimed in claim 4, wherein said independent longitudinal sections are fed from a common cooling fluid source.

6. The installation as claimed in claim 4, wherein means are provided for regulating the fluid flow through each of said sections.

7. The installation as claimed in claim 1, wherein said bell-mouth end portion of said external jacket is adapted for allowing a cooling fluid to flow therein.

8. The installation as claimed in claim 1, wherein said external and internal jackets are made from metal.

9. The installation as claimed in claim 1, wherein the silencer is mobile with respect to said device.

10. The installation as claimed in claim 1, wherein the silencer has an air suction chimney at an upstream end thereof with respect a flow direction of the exhaust gas jet of the reactor, a downstream portion of the collecting device being disposed under said chimney.

11. A jet engine exhaust gas deflector device adapted to cooperate with a jet engine and direct exhaust gas from the engine axially to a noise attenuator having a substantially cylindrical shape wherein said deflector comprises;
   an outer jacket having a substantially cylindrical body with an annular outlet and a substantially bell-shaped inlet;
   an inner jacket disposed coaxially to the outer jacket and having a substantially cylindrical body with a longitudinal axis, wherein the inner jacket receives exhaust gas from a jet engine and directs the exhaust gas substantially longitudinally to the axis of the inner jacket to said attenuator, the cylindrical body of said inner jacket comprising coils having a hollow volume to receive a cooling fluid.

12. The exhaust gas deflector of claim 11, wherein the inner jacket includes a substantially conical outlet.

13. The exhaust gas deflector of claim 11, wherein said cooling coils receiving said cooling fluid extend substantially longitudinally to the inner jacket.

14. The exhaust gas deflector of claim 13, wherein the cooling coils comprise independent radial sections of cooling coils extending substantially longitudinally in a direction of the axis of said inner jacket.

15. The exhaust gas deflector of claim 30 further comprising control means to selectively control the flow of cooling fluid through the independent sections whereby preselected selections of the inner jacket are protected from overheating by hot exhaust gas entering the inner jacket from a jet engine having a longitudinal axis diverging from a longitudinal axis of the jacket and being directed substantially toward the inner jacket.

* * * * *